United States Patent [19]
DiPerna

[11] 3,847,816
[45] Nov. 12, 1974

[54] POLLUTION SUCTION WATER SWEEPER

[76] Inventor: James DiPerna, 85 Foxhill Ter., Staten Island, N.Y. 10305

[22] Filed: Mar. 7, 1973

[21] Appl. No.: 339,381

[52] U.S. Cl. .......................... 210/242, 210/DIG. 21
[51] Int. Cl. ............................................. E02b 15/04
[58] Field of Search ................ 210/83, 242, DIG. 21

[56] References Cited
UNITED STATES PATENTS

| | | | |
|---|---|---|---|
| 3,219,190 | 11/1965 | Tnune................................ | 210/242 |
| 3,666,098 | 5/1972 | Garland et al. ...................... | 210/242 |
| 3,688,506 | 9/1972 | Marocchio............................ | 210/242 |
| 3,730,346 | 5/1973 | Prewitt............................... | 210/242 |
| 3,684,095 | 8/1972 | Ayers.................................. | 210/242 |
| 3,578,171 | 5/1971 | Usher.......................... | 210/DIG. 21 |
| 3,667,608 | 6/1972 | Burroughs.................... | 210/DIG. 21 |
| 3,221,884 | 12/1965 | Muller............................... | 210/242 |
| 3,529,720 | 9/1970 | Chablaix...................... | 210/DIG. 21 |

*Primary Examiner*—Theodore A. Granger
*Attorney, Agent, or Firm*—Carl Miller

[57] ABSTRACT

A vessel equipped with an apparatus to sweep the surface of a body of water and remove floating oil therefrom, the vessel comprising an oil tanker ship containing a series of oil collection tanks within its hold, a floating oil harvesting ring being towed in front of the ship by director tugs that are electronically controlled from the ship, the harvesting ring including a skimmer section into which gathered floating oil is sucked and conveyed from the skimmer through intake tubes to the interior of the ship, where it is passed into the series of tanks.

1 Claim, 4 Drawing Figures

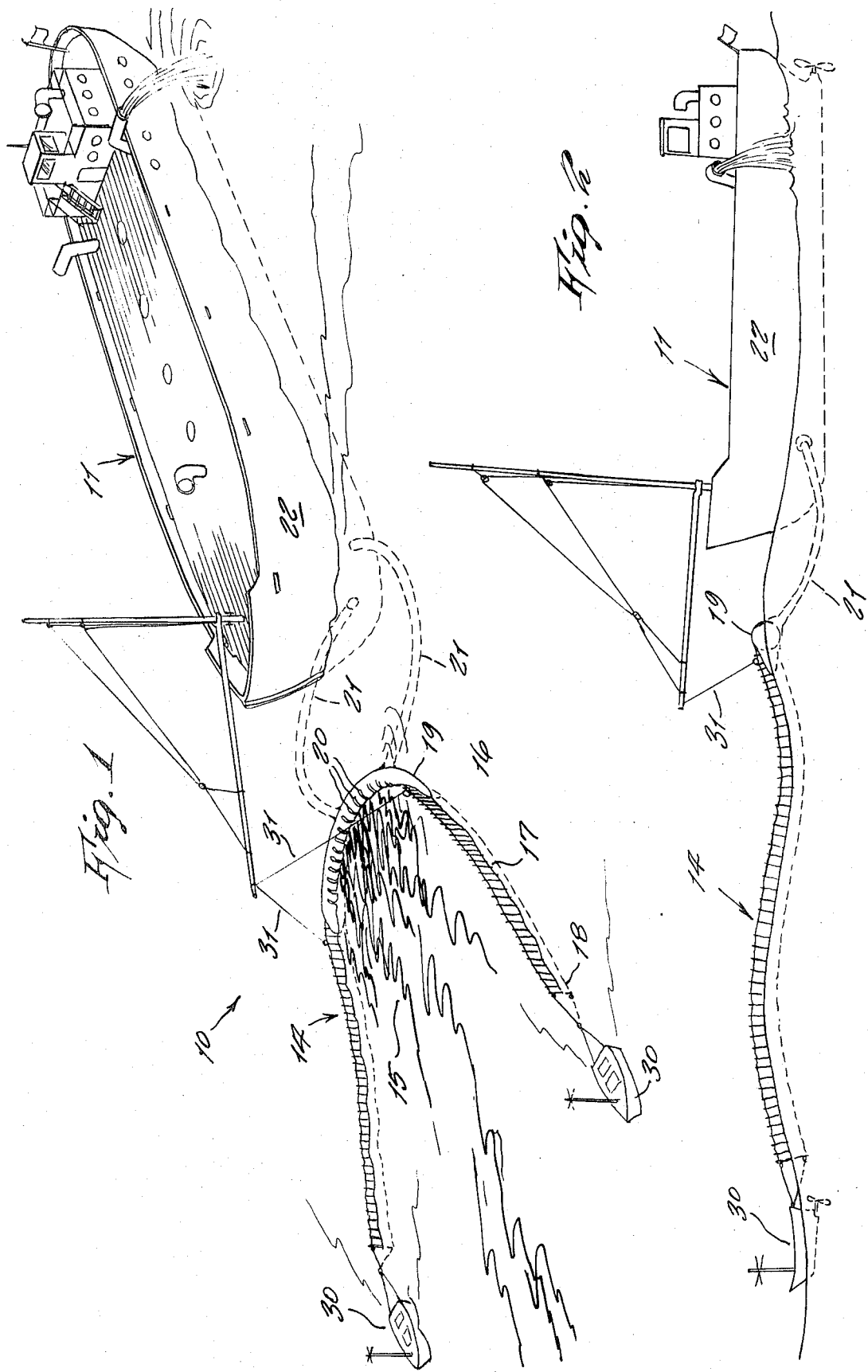

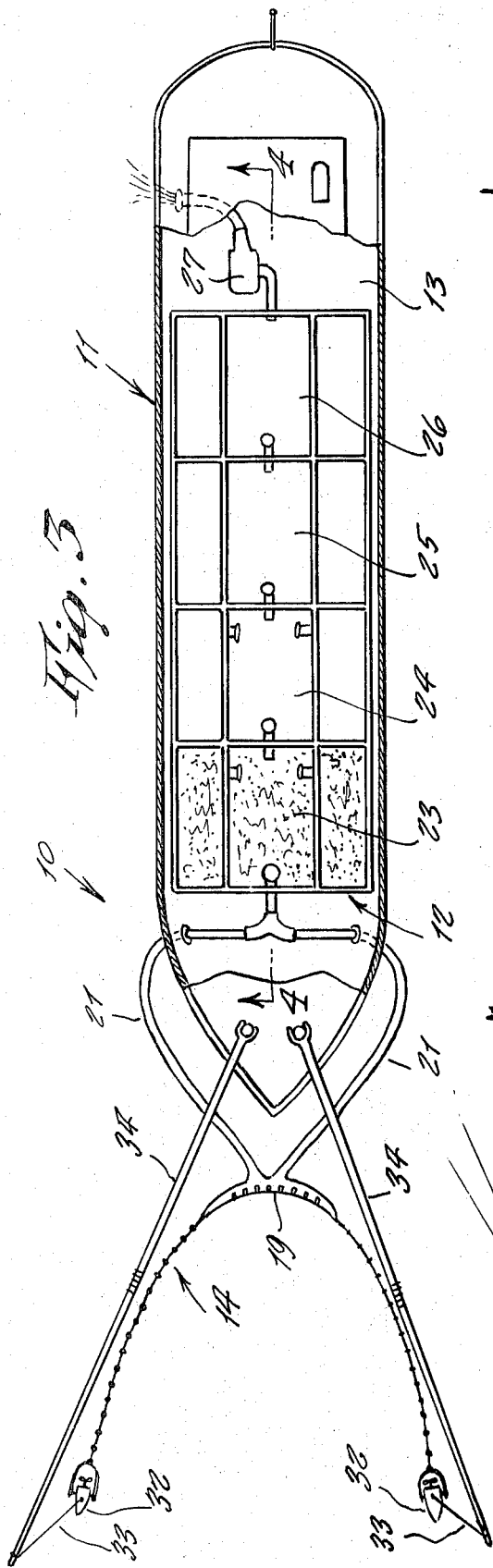
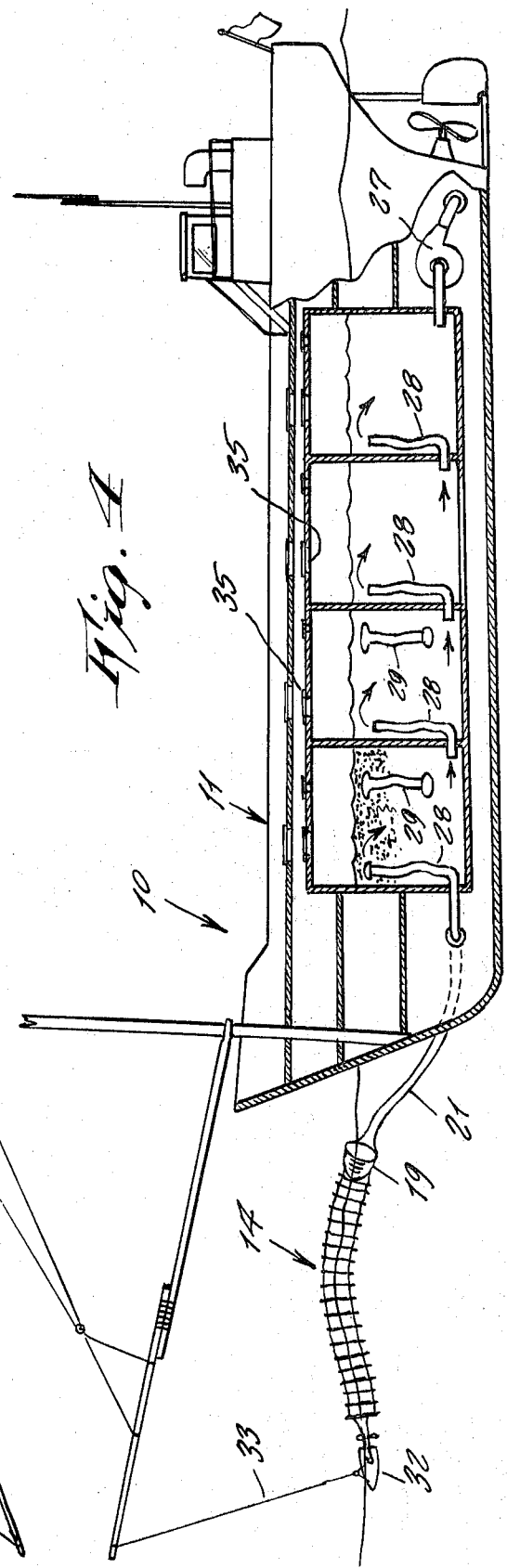

POLLUTION SUCTION WATER SWEEPER

This invention relates generally to apparatus for cleaning up oil slick that get spilled into a sea, lake or other large water body and is an improvement of my U.S. Pat. No. 3,651,943 issued Mar. 28, 1972.

It is well known that finally mankind has become seriously concerned about the pollution of the natural environment, and such concern exists not only for the continental lands of the world but also for the oceans and other water bodies into which pollution has been allowed to accumulate. Accordingly, whenever a large spill of oil occurs in a water body such as by the ship wreck of an oil tanker or a leak in an off shore underwater oil well, such leak destroys wildlife in the water as well as beaches and it spoils the beaches and shores upon which it finally washes. Heretofore volunteers have been called up to clean up oil soaked beaches by soaking up the oil slick into gathered straw, and wildlife such as sea birds that survive are tried to be captured and washed off. Such devastation is serious and a solution is therefore urgently needed to prevent such situation developing, once a large oil quantity escapes into a sea.

Therefore, it is a principle object of the present invention to provide a means whereby spilled oil in a sea can be removed once it gets upon the sea surface and before it spreads out and washes up on a coastline of a land.

Another object is to provide a pollution suction water sweeper which is designed for a large scale operation, so that a vast surface of a sea can be quickly and easily swept clean of an oil slick, and the gathered oil can then be transported to any suitable place.

Another object is to provide a pollution suction water sweeper wherein the gathered oil is sufficiently separated from the water so to be purified and be serviceable thereafter again.

Yet another object is to provide a pollution suction water sweeper wherein the principles of the invention can be applied upon land such as in industrial plants and other places where spilled oil within water can be reclaimed so to purify the water and leave it non-contaminated.

Other objects are to provide a pollution suction water sweeper which is simple in desigm, inexpensive to manufacture, rugged in construction, easy to use and efficient in operation.

Further objects of the invention will appear as the description proceeds.

To the accomplishment of the above and related objects this invention may be embodied in the form illustrated in the accompanying drawings, attention being called to the fact, however, that the drawings are illustrative only, and that changes may be made in the specific construction illustrated and described within the scope of the appended claims.

FIG. 1 is a perspective view of the invention shown in use.

FIG. 2 is a side view thereof.

FIG. 3 is a top view of a slightly modified design of the invention and showing the tank system within the ship.

FIG. 4 is a cross-sectional view taken on line 4—4 of FIG. 3.

Referring now to the drawing in detail, the reference numeral 10 represents a pollution suction water sweeper according to the present invention, wherein there is an oil tanker ship 11 having an oil collection tank system 12 within its hold 13.

In front of the ship, a harvesting ring 14 is pulled so to gather up an oil slick 15 from a surface of a sea 16. The ring 14 consists of a flexible empty accordion like hose 17 at each end with an apron 18 attached thereto, the aprons having weights to hold down the bottom of the apron. Between the ends of the ring, a central portion forms a skimmer 19 and consists of a wide hose having a series of slotted vertical openings 20 on a front side so that the oil slick can enter inside. The skimmer is connected to two flexible hoses 21 that pass through openings in the hull 22 and into the ship hold 13. Gravitation may be employed to move the collected mixture of water and oil slick to the tank system 12 which is below a sea level of the sea water.

The tank system 12 consists of individual tanks 23, 24, 25 and 26 through which the oil slick mixture progressively flows in sequence so that the heaviest collection of debris and oil occurs in the first tank, and progressively each following tank has less oil collection, so that a final tank is almost pure sea water, and from which the water is moved through a pump 27 that dumps it out back into the sea. Interconnecting flexible hoses 28 communicate between the tanks so to move the flowing mixture therebetween. A floating light debris collector 29 is located in tanks 23 and 24.

As shown in FIGS. 1 and 2, the ring 14 is pulled in front of the ship by a director tug 30 at each end of the ring, the tub being controlled electronically by signals from a control station within the ship, so to guide the director speed and direction of steering. A guide line 31 from the ship bowsprit physically engages the ship with the ring additionally.

In FIGS. 3 and 4 a modified design for pulling the ring is shown to comprise directors 32 at the ends of the ring being connected by lines 33 to a pair of forwardly extending booms 34 of the ship so to guide them, thus eliminating the above described electronic control system.

Each tank has manholes 35 to allow entry by workmen to periodically clean out the tank whenever needed, as shown in FIG. 4.

Thus a practical apparatus is provided for sweeping up large sea surface areas for removal of spilled oil.

It is to be clearly understood that any debris lighter than water does not go through the water, inasmuch as water itself is a perfect strainer, and furthermore the debris floats on the surface of the water. Thus it will be seen by referring to FIG. 3 and FIG. 4, it is shown that the individual tank 23 collects the major part of the debris, and the clearer water then flows into the next individual tank 24 and the clearest water will then flow into the last individual tank 25.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What I claim as new and desire to secure by Letters Patent is:

1. In a pollution suction water sweeper, the combination of a ship, tugs, and a floating harvesting ring in front of said ship, and means to collect oil from a sea surface, said means comprising intake lines extending from said ring to an oil collection tank system located inside a hold of said ship, said ring comprising an elongated assembly which at its opposite ends comprises a flexible empty accordian-like hose that includes a weighed apron, and a central portion with a front side and a rear side between said hoses comprising a skimmer consisting of a hose with the interior of said hose connected to said intake lines, said skimmer hose having a plurality of spaced apart, transverse extending vertically slitted openings that are located on said front side of said skimmer hose so to admit said oil to the interior of said central hose portion, the ends of said harvesting ring being connected to director tugs in front of said ship and which tugs pull said ring ends in a forward direction, said tugs being guided by electronic signals from a control station within said ship, said collection tank system comprising a series of tanks through which a collected mixture of sea water and oil is progressively passed in series whereby oil may be collected therein and separated water discharged from said tanks by pump means.

* * * * *